UNITED STATES PATENT OFFICE.

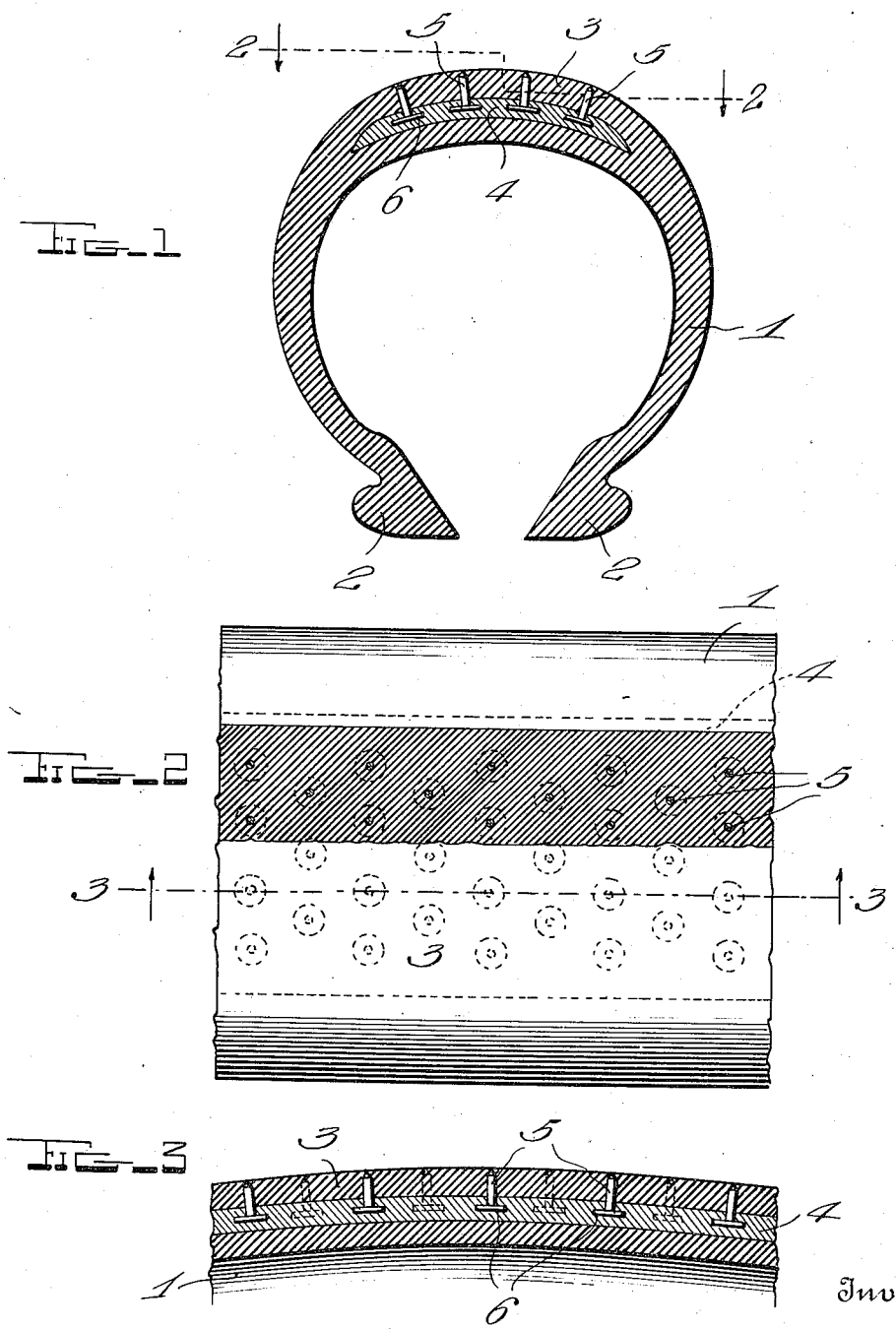

JOHN L. SWARTZ, OF AKRON, OHIO.

NON-SKID TIRE.

1,215,216.  Specification of Letters Patent.  Patented Feb. 6, 1917.

Application filed August 23, 1915. Serial No. 46,868.

*To all whom it may concern:*

Be it known that I, JOHN L. SWARTZ, a citizen of the United States, residing at Akron, in the county of Summit and State of Ohio, have invented certain new and useful Improvements in Non-Skid Tires; and I do declare the following to be a full, clear, and exact description of the invention, such as will enable others skilled in the art to which it appertains to make and use the same.

My invention relates to improvements in vehicle tires and more particularly to those of the pneumatic type, the object of the invention being to so improve the construction of such tires as to reduce the liability of puncture, and at the same time, to provide a novel form of anti-skid tread.

With this general object in view, the invention resides in certain novel features of construction and in unique combinations of parts to be hereinafter fully described and claimed, the descriptive matter being supplemented by the accompanying drawings wherein:

Figure 1 is a transverse section through a tire constructed in accordance with the invention;

Fig. 2 is a plan view of the tread with parts in section on the plane designated by the lower half of the line 2—2 of Fig. 1, and Fig. 3 is a longitudinal section through the tread portion of the tire as viewed on the plane of the line 3—3 of Fig. 2.

In this drawing which constitutes a part of the application, and in which like reference characters designate corresponding parts throughout the several views, the numeral 1 indicates broadly a tire casing which is usually constructed of rubber reinforced by a carcass of canvas or the like. The casing 1 is provided with the usual beads 2 for engagement by the clencher rings on the vehicle wheel and with a thickened tread portion 3 which it is the intention of the invention to render non-skid and approximately puncture proof.

In accomplishing this end, a strip 4 of tough yet pliable material such as semi-hard rubber, is embedded in the tread portion of the tire, and a plurality of anti-skid devices 5 extend from said band to the tread proper and are provided with integral flat disk-like heads 6 embedded in said strip, the devices 5 being shown in the form of hardened studs.

As the tire engages the roadbed, and the thread portion 3 compresses, the studs will be presented for engagement with the roadbed, thus preventing skidding. Obviously, as the tread wears, the studs will likewise wear, thus causing the tire to be equally as efficient after considerable use as in its original state.

The strip 4 which is in the form of a band extending throughout the circumference of the tread, not only serves as means for reliably anchoring the devices 5, but greatly reduces the liability of puncture, since obviously the semi-hard rubber will greatly resist piercing of the casing by glass, nails, and the like.

The studs 5 may be positioned in staggered relation as shown in Figs. 2 and 3 of the drawings, or may be disposed in any other appropriate manner.

A tire tread constructed as above described, although being simple, easy to manufacture, and therefore comparatively inexpensive, will be a highly efficient and durable article possessing a number of advantageous characteristics.

I claim:

A tire comprising a casing formed of highly yieldable rubber, having an integral annular imperforate band of semi-hard rubber molded in and surrounded on all sides by the highly yieldable rubber forming the tread portion of said casing, said band continuing throughout the circumference of said portion and being of a width substantially equal to the tread proper of the casing, and a multiplicity of tread members having portions molded in the aforesaid band, the remainder of said members being molded in the tread of the casing.

In testimony whereof I have hereunto set my hand in presence of two subscribing witnesses.

JOHN L. SWARTZ.

Witnesses:
  JACOB HEDDESHEIMER,
  RUTH HEDDESHEIMER.

Copies of this patent may be obtained for five cents each, by addressing the "Commissioner of Patents, Washington, D. C."